(12) United States Patent
Jamal-Syed et al.

(10) Patent No.: US 10,123,325 B2
(45) Date of Patent: Nov. 6, 2018

(54) METHOD FOR MANAGING TRANSMISSIONS OF DATA FROM A PLURALITY OF MACHINE-TO-MACHINE DEVICES

(71) Applicant: Telefonaktiebolaget L M Ericsson (publ), Stockholm (SE)

(72) Inventors: Shaheer Jamal-Syed, Shanghai (CN); Andreas Ljunggren, Vällingby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 120 days.

(21) Appl. No.: 14/894,154

(22) PCT Filed: May 29, 2013

(86) PCT No.: PCT/SE2013/050617
§ 371 (c)(1),
(2) Date: Nov. 25, 2015

(87) PCT Pub. No.: WO2014/193277
PCT Pub. Date: Dec. 4, 2014

(65) Prior Publication Data
US 2016/0105889 A1    Apr. 14, 2016

(51) Int. Cl.
*H04W 72/04* (2009.01)
*H04W 4/06* (2009.01)
(Continued)

(52) U.S. Cl.
CPC ......... *H04W 72/0446* (2013.01); *H04W 4/06* (2013.01); *H04W 4/70* (2018.02);
(Continued)

(58) Field of Classification Search
CPC ... H04W 4/005; H04W 72/0446; H04W 4/08; H04W 4/06
(Continued)

(56) References Cited

U.S. PATENT DOCUMENTS

2011/0053585 A1    3/2011  Otonari
2011/0199905 A1*   8/2011  Pinheiro ........... H04W 28/0215
                                                           370/235
(Continued)

FOREIGN PATENT DOCUMENTS

EP    2445165 A1    4/2012
EP    2536093 A1    12/2012
(Continued)

OTHER PUBLICATIONS

Extended European Search Report dated Apr. 21, 2016 in corresponding European Application No. 13885543.2, 10 pages.

*Primary Examiner* — Charles C Jiang
*Assistant Examiner* — Will W Lin
(74) *Attorney, Agent, or Firm* — Rothwell, Figg, Ernst & Manbeck, p.c.

(57) ABSTRACT

A method executable in a network node, capable of managing transmission of data transmitted over a unicast channel in a communication network from a plurality of M2M devices located in a broadcast service area is provided. Upon receiving a request to transmit collected data over the communication network via a unicast channel from a M2M device located in the first broadcast service area, the network node determines when to allow transmission of the collected data for M2M devices located in the first broadcast service area, on the basis of the network load of the communication network. The result is transmitted to the M2M devices located in the first broadcast service area, instructing at least one of these M2M devices when to transmit collected data over the unicast channel.

30 Claims, 9 Drawing Sheets

(51) Int. Cl.
*H04W 4/70* (2018.01)
*H04W 72/12* (2009.01)
*H04W 4/90* (2018.01)

(52) U.S. Cl.
CPC .......... *H04W 72/1252* (2013.01); *H04W 4/90* (2018.02); *H04W 72/1289* (2013.01)

(58) Field of Classification Search
USPC ........................................ 370/329, 312, 230
See application file for complete search history.

(56) References Cited

U.S. PATENT DOCUMENTS

| | | | | |
|---|---|---|---|---|
| 2011/0201344 | A1* | 8/2011 | Ryu | H04W 4/70 455/450 |
| 2011/0292893 | A1* | 12/2011 | Lee | H04W 74/002 370/329 |
| 2011/0299492 | A1* | 12/2011 | Lee | H04W 4/00 370/329 |
| 2012/0044865 | A1 | 2/2012 | Singh et al. | |
| 2012/0109406 | A1 | 5/2012 | Yousefi et al. | |
| 2012/0163271 | A1* | 6/2012 | Kwon | H04W 4/06 370/312 |
| 2012/0170451 | A1* | 7/2012 | Viswanathan | H04W 4/005 370/230 |
| 2013/0040678 | A1 | 2/2013 | Lee et al. | |
| 2013/0051228 | A1* | 2/2013 | Kim | H04L 47/115 370/230 |
| 2013/0077484 | A1* | 3/2013 | Zhao | H04W 4/005 370/230 |
| 2013/0242825 | A1* | 9/2013 | Farhadi | H04W 72/121 370/311 |
| 2014/0050141 | A1* | 2/2014 | Ma | H04L 5/003 370/312 |

FOREIGN PATENT DOCUMENTS

| | | |
|---|---|---|
| WO | 2011054149 A1 | 5/2011 |
| WO | 2012115551 A1 | 8/2012 |
| WO | 2013002907 A1 | 1/2013 |
| WO | 2013009346 A1 | 1/2013 |

* cited by examiner

METHOD FOR MANAGING TRANSMISSIONS OF DATA FROM A PLURALITY OF MACHINE-TO-MACHINE DEVICES

CROSS-REFERENCE TO RELATED APPLICATIONS

This application is a 35 U.S.C. § 371 National Phase Entry Application from PCT/SE2013/050617, filed May 29, 2013, and designating the United States.

TECHNICAL FIELD

The present disclosure relates to a method for managing transmission of data transmitted over a unicast channel from M2M devices, to network node capable of executing the suggested method and to a M2M device capable of transmitting data over a unicast channel.

BACKGROUND

The term "Internet of Things" has come to describe a number of technologies and research disciplines that enable the Internet to reach out into the real world of physical objects. Technologies like Radio-Frequency Identification (RFID), short-range wireless communications, real-time localization and sensor networks are now becoming increasingly common, bringing the Internet of Things into commercial use. They foreshadow an exciting future that closely interlinks the physical world and cyberspace—a development that is not only relevant to researchers, but to corporations and individuals alike. This development is now moving, not only into the operator space, but also to other areas, such as e.g. transportation and healthcare. This concept includes widespread use of Machine to machine (M2M) devices, i.e. devices which are deployed to collect data and provide the collected data to the network for further processing. How and when data is collected is out of scope of this disclosure, and may therefore be done according to any rules and procedures which may be applied for M2M devices arranged in broadcast service areas as described herein.

With the increase in the number of used M2M devices, acting as either standalone M2M devices collecting data, or acting as aggregation points for other M2M devices, a problem arises when it comes to how to make use of the network resources for transmission of collected data over a network more efficiently.

If all M2M devices starts to push data whenever they are able to, it will result in high amounts of data being fed into the network in an untimely manner which may very well result in bursts of traffic over the top of the existing high amount of data traffic towards the users. Thus it becomes extremely important to manage not just the outflow of data from the network but also the influx of data towards the network. This is today not controlled by the network and may therefore be a cause of problems with existing solutions, and will probably become an even bigger problem in the future. Most importantly, this issue will multiply with each M2M device deployed in the network.

SUMMARY

It is an object of the present document to address, or at least alleviate, the problem described above.

According to one aspect, a method to be executed in a network node is suggested which is capable of managing transmission of data transmitted over a unicast channel in a communication network from a plurality of M2M devices located in at least one broadcast service area. The suggested method comprise: receiving, from a first of the plurality of M2M devices located in a first broadcast service area, a request to transmit collected data over the communication network via a unicast channel; determining, on the basis of the network load of the communication network, when to allow transmission of the collected data for M2M devices located in the first broadcast service area; transmitting, via broadcast transmission, at least a first message, addressed to M2M devices located in the first broadcast service area, instructing at least one of the M2M devices when to transmit collected data over the unicast channel, and receiving collected data transmitted over the unicast channel.

An advantage with such a method is that each M2M device located within a certain area can be addressed with the same instructions, thereby allowing the network node to control not only transmission in the downlink but also uplink transmission in the network.

According to one embodiment, the step of transmitting comprise: transmitting, via broadcast transmission, at least a first message, addressed to M2M devices located in the first broadcast service area, instructing the M2M devices not to transmit any collected data, and transmitting, via broadcast transmission, a second message, addressed to at least one of the M2M devices located in the first broadcast service area, including the first M2M device, the second message indicating to the at least one addressed M2M device when it is allowed to initiate transmission of collected data. Thereby any uplink data transmission is first prohibited before allowing such transmission from a broadcast service area, thereby assuring that no ongoing transmission is executed when any requested transmission is allowed.

According to another embodiment the first message may comprise information instructing M2M devices of the first broadcast service area to provide, to the network node, M2M device specific data. The method comprise the steps of receiving, in response to the first message, a response message comprising the requested M2M specific data; scheduling at least one of the M2M devices for which the requested information has been provided; providing, in the second message, a time stamp and a queue number for each of the scheduled M2M devices, and receiving collected data from the scheduled M2M devices according to the time stamps and queue number. Thereby, individual M2M devices can be scheduled, allowing the network node even better control of the uplink data transmissions originating from M2M devices.

The M2M device specific data may comprise information on amount of data requested to be sent via the unicast channel, while the M2M device specific data may comprise an indication of the present status of at least one M2M device. In addition, each M2M device may be identifiable by the network node by a unique identifier, thereby enabling each M2M device to be uniquely addressed, rather than only addressing all M2M devices of a broadcasting service area with the same instructions.

According to another aspect, a method to be executed in an M2M device capable of transmitting data over a unicast channel to a network node of a communication network when located in a broadcast service area is provided. The method comprise: recognizing collected data to be transmitted; transmit, to the network node, a request to transmit collected data over the communication network via a unicast channel; receiving, via broadcast transmission, at least a first message, instructing at least the M2M device when to transmit collected data over the unicast channel, and transmitting collected data over the unicast channel.

According to one embodiment the receiving comprise: receiving, via broadcast transmission, at least a first message, addressed to the M2M device, instructing the M2M device not to transmit any collected data, and receiving, via broadcast transmission, a second message, addressed to the M2M device, indicating to the M2M device when it is allowed to initiate transmission of collected data.

According to another embodiment, the first message also comprises information instructing the M2M device to provide, to the network node, M2M device specific data. Such a method may comprise the further steps of: transmitting, in response to the first message, a response message comprising the requested M2M specific data; receiving, in the second message, at least a time stamp and a queue number for the M2M device, and transmitting collected data to the network node, according to the time stamp and queue number.

The M2M device specific data may comprise information on the amount of data needed to be sent from the M2M device via the unicast channel. In addition, or alternatively, the M2M device specific data comprises an indication of the present status of at least the M2M device.

In addition, each transmission to the network node may comprise a unique identifier, allowing the respective M2M device from which data is provided to be identified.

According to yet another aspect, a network node capable of managing transmission of data transmitted over a unicast channel in a communication network by a plurality of M2M devices located in at least one broadcast service area, is provided. Such a network node may, according to one embodiment, comprise at least one processor, and a memory capable of storing instructions which, when executed by the at least one processor causes the network node to: receive, from a first of the plurality of M2M devices located in a first broadcast service area, a request to send collected data over the communication network via a unicast channel; determine, on the basis of the network load of the communication network, when to allow transmission of the collected data for M2M devices located in the first broadcast service area, transmit, via broadcast transmission, at least a first message, addressed to M2M devices located in the first broadcast service area, instructing at least one of the M2M devices when to transmit data over the unicast channel, and receive data transmitted over the unicast channel.

Executable instructions may also cause the network node to: transmit, via broadcast transmission, at least a first message, addressed to M2M devices located in the first broadcast service area, instructing the M2M devices not to transmit any collected data, and transmit, via broadcast transmission, a second message, addressed to at least one of the M2M devices located in the first broadcast service area, including the first M2M device, indicating to the at least one addressed M2M device when it is allowed to initiate transmission of collected data.

Executable instructions may further cause the network node to: receive, in response to the first message, a response message comprising the requested M2M specific data; schedule at least one of the M2M devices for which the requested information has been provided; provide, in the second message, a time stamp and a queue number for each of the scheduled M2M devices, and receive collected data from the scheduled M2M devices according to the time stamps and queue numbers.

According to yet another embodiment, a computer program for managing transmission of data transmitted over a unicast channel in a communication network by a plurality of M2M devices located in at least one broadcast service area, is provided, where the computer program comprise computer readable code units which, when run on a computer causes the computer to: receive, from a first of the plurality of M2M devices located in a first broadcast service area, a request to send collected data over the communication network via a unicast channel; determine, on the basis of the network load of the communication network, when to allow transmission of the collected data for M2M devices located in the first broadcast service area, transmit, via broadcast transmission, at least a first message addressed to M2M devices located in the first broadcast service area, instructing at least one of the M2M devices when to transmit data over the unicast channel, and receive data transmitted over the unicast channel.

According to another aspect, a computer program product, comprising computer readable medium and a computer program as suggested above, stored on the computer eradable medium, is also provided.

According to yet another aspect an M2M device capable of transmitting data over a unicast channel to a network node of a communication network when located in a broadcast service area is provided. The M2M device comprise at least one processor, and a memory storing instructions which, when executed by the at least one processor causes the M2M device to: recognize data to be transmitted; transmit, to the network node, a request to transmit collected data over the communication network via a unicast channel; receive, via broadcast transmission, at least a first message, instructing at least the M2M device when to transmit collected data over the unicast channel, and transmit collected data over the unicast channel.

The M2M device may, according to one embodiment, be further capable of storing instructions which, when executed by the at least one processor causes the M2M device to: receive, via broadcast transmission, at least a first message addressed to the M2M device, instructing the M2M device not to transmit any collected data, and receive, via broadcast transmission, a second message addressed to the M2M device, indicating to the M2M device when it is allowed to initiate transmission of collected data.

According to another embodiment, the M2M device may be further capable of storing instructions which, when executed by the at least one processor, causes the M2M device to: transmit, in response to the first message, a response message comprising the requested M2M specific data; receive, in the second message, at least a time stamp and a queue number for the M2M device, and transmit, collected data to the network node, according to the time stamp and queue number.

In addition, the M2M device may further be capable of storing instructions which, when executed by the at least one processor causes the M2M device to provide information on amount of collected data needed to be sent via the unicast channel and/or to provide an indication of the present status of the M2M device, in case such M2M device specific data is requested by the network node.

Furthermore, the M2M device may further be capable of storing instructions which, when executed by the at least one processor causes the M2M device to insert, to each request or message transmitted via unicast to the network node, a unique identifier, identifying the M2M device.

According to another aspect, a computer program for transmitting data over a unicast channel to a network node of a communication network, the computer program comprising computer readable code units, is provided which, when run on a computer causes the computer to: recognize data to be transmitted; transmit, to the network node, a request to transmit collected data over the communication network via a unicast channel; receive, via broadcast transmission, at least a first message, instructing at least the M2M device when to transmit collected data over the unicast channel, and transmit collected data over the unicast channel.

According to yet another aspect, a computer program product, comprising computer readable medium and a computer program as suggested above, stored on the computer readable medium, is provided.

BRIEF DESCRIPTION OF DRAWINGS

Embodiments will now be described in more detail in relation to the accompanying drawings, in which:

FIG. 9b is a block scheme of an alternative processor configuration suitable for the network node according to FIG. 9a.

FIG. 10b is a block scheme of an alternative processor configuration suitable for the M2M device according to FIG. 10a.

DETAILED DESCRIPTION

Briefly described, the present document refers to a method for managing unicast transmission of data from M2M devices over a communication network.

More specifically, a method is suggested where instructions associated with unicast data transmission requested from a M2M device is provided to the M2M device via broadcasting, typically by applying MBMS or eMBMS.

Multimedia Broadcast Multicast Services (MBMS) is a point-to-multipoint technology applicable for existing and upcoming 3GPP cellular networks, which is designed to provide efficient delivery of broadcast and multicast services, both within a cell, as well as within the core network. For broadcast transmission across multiple cells, it defines transmission via single-frequency network configurations. Target applications typically include mobile TV and radio broadcasting, as well as file delivery and emergency alerts. Evolved MBMS (eMBMS), is a multicast technology which is adapted for providing Long Term Evolution (LTE) broadcasting.

By combining broadcasting, such as MBMS or eMBMS, with unicast M2M uplink transmission an enhanced management of network resource utilisation will be provided, wherein M2M devices are easily instructed how to proceed when having data to transmit, and wherein M2M devices are allowed to transmit data only when the network is in a state suitable for receiving data without risking of going into an overload condition.

Figure 1:
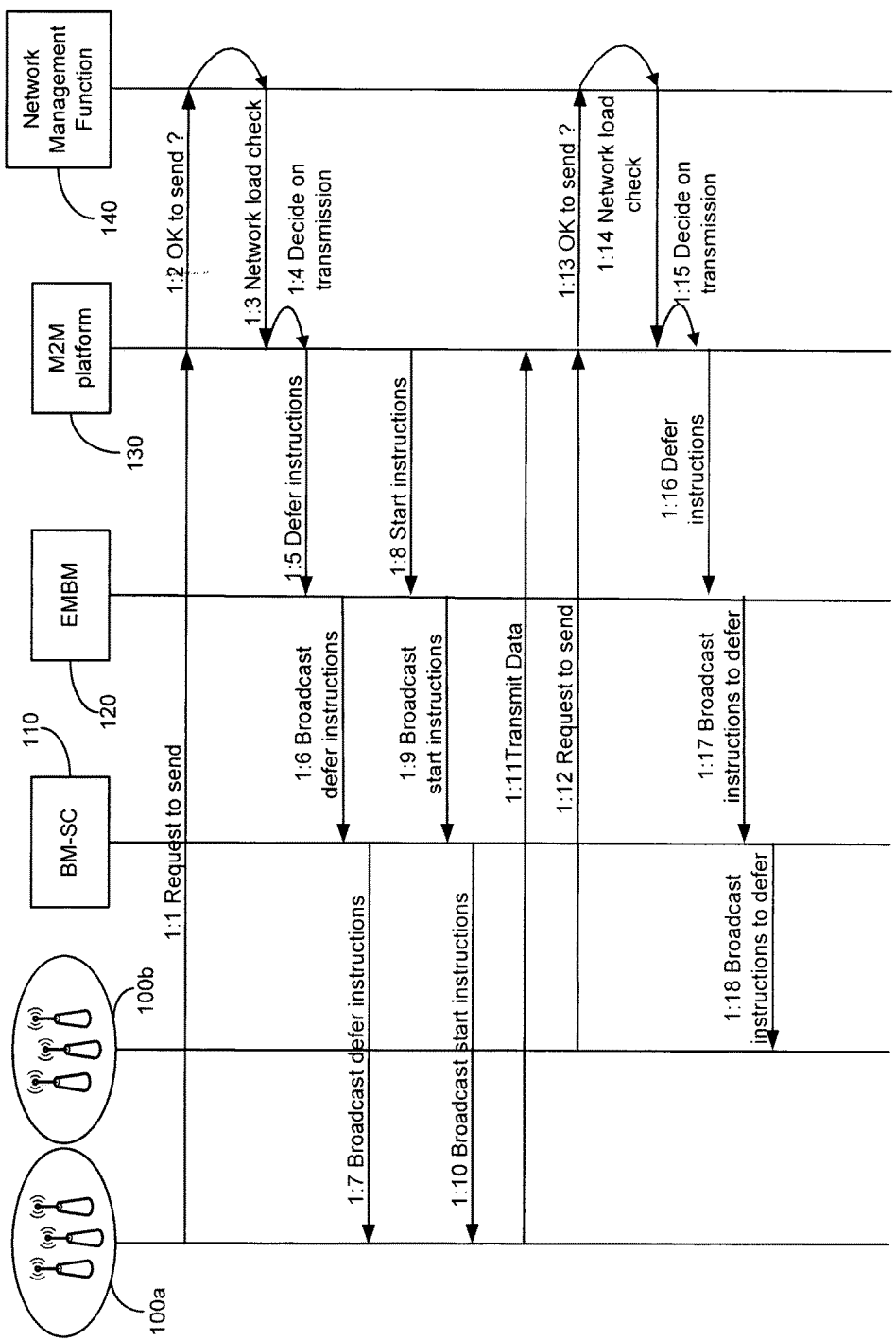
FIG. 1 is a signalling scheme illustrating a method of managing unicast transmission according to a first embodiment.
Figure 2:
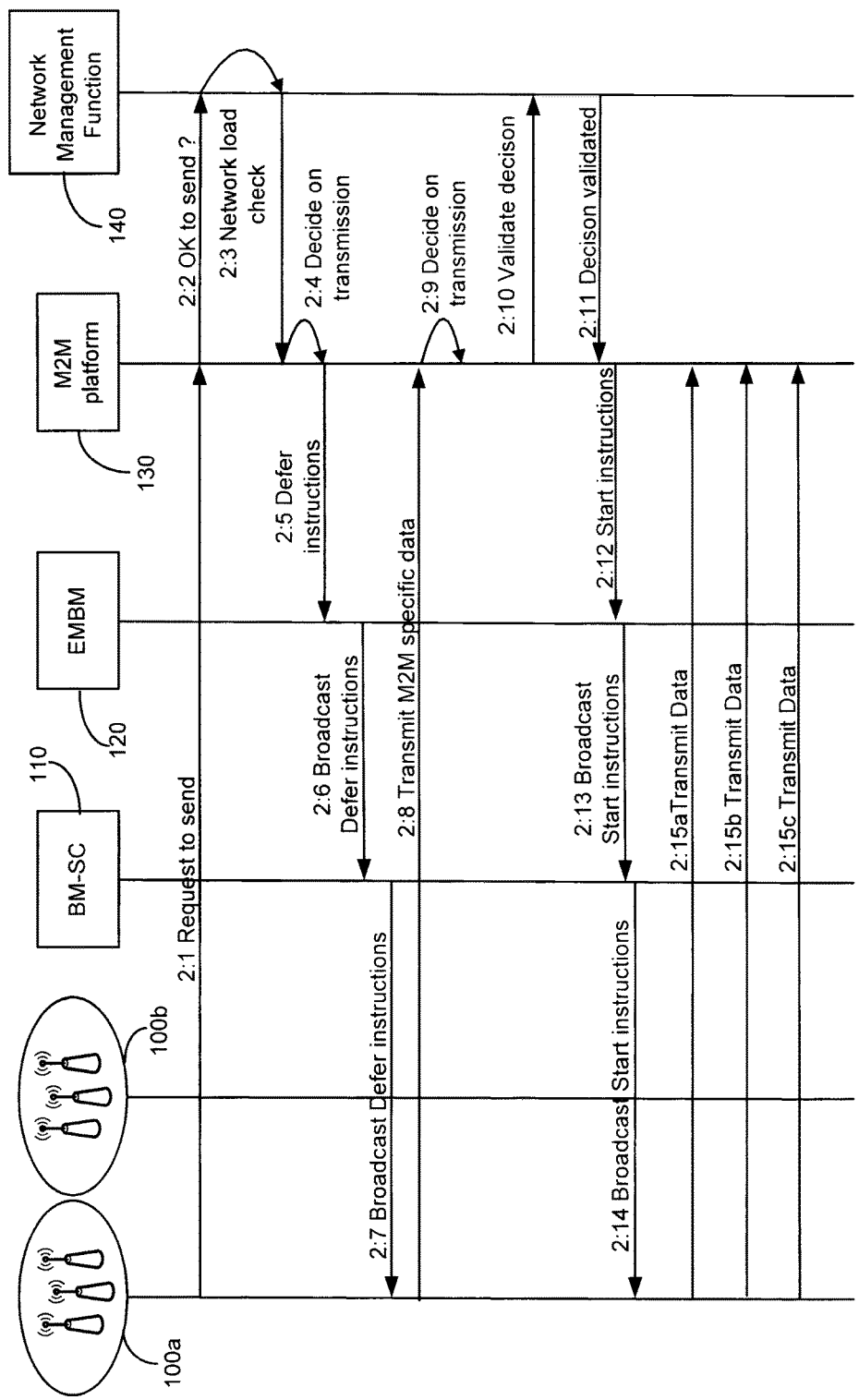
FIG. 2 is a signalling scheme illustrating a method of managing unicast transmission according to a second embodiment.

FIGS. 1 and 2 refer to signaling schemes according to two different scenarios where communication provided from Machine-to-Machine (M2M) devices to a network node, which may alternatively be referred to as Machine Type Communication (MTC) devices, via a unicast channel, can be managed under supervision from a network node, here represented by a M2M platform. In the present context M2M devices are to be construed as any type of devices which are capable of executing some type of data collection and/or processing without requiring any human intervention to take place. M2M devices may e.g. include smart metering devices, asset aggregation points, or healthcare devices capable of collecting certain measurement data at regular and/or predetermined intervals. A smart metering device may e.g. be arranged such that it is encompassing as much as 50 or even more apartments. Such a device may be configured to aggregate information, such as e.g. indications on consumption of one or more of electricity, water, and gas, and transmit such aggregated information to a M2M platform for brokering to the respective providers, e.g. on a weekly or monthly basis. Asset aggregation points may be installed in a number which allow coverage of a specific area, such as e.g. the buildings of a shopping mall, where each asset aggregation point is configured to receive miscellaneous information, collected by one or more sensors. Sensors may e.g. collect information, representative of customer behaviour, e.g. from RFID tags worn by persons and/or vehicles passing by, wherein the asset aggregation points are configured to transmit the collected information to a M2M platform e.g. on a daily or even hourly basis. Health care devices may be configured to monitor certain measures via sensors and transmit the monitored information on a regular basis, such as e.g. every minute or second. It is evident that the described examples may result in transmission of a large amount of data. One or more of these M2M devices may be capable of transmitting collected data to the network via any type of unicast bearer provided by the network, while other M2M devices may be configured only to collect data, while transmission of the collected data to the M2M platform is handled by one or more other M2M devices, specifically dedicated for distribution of collected data to the M2M platform. When referring to M2M devices this document consequently refers to the former type of M2M devices, unless specified otherwise.

In FIG. 1, a communication network is arranged to manage communication involving M2M devices, distributed over a plurality of broadcast service areas, here represented by two broadcast service areas 100a,100b, as typically applied by MBMS or eMBMS, such that only a first group of M2M devices located in a first broadcast service area 100a, or a second group of M2M devices located in a second broadcast service area 100b, are allowed to communicate over a unicast bearer at a time.

While FIG. 1 refers to a scenario where either all or none of the M2M devices located within a broadcast service area are either allowed or prohibited by the network to transmit data at a certain occasion, FIG. 2 refers to an alternative scenario where the network node managing the unicast transmissions from the M2M devices can send distinguishing instructions addressed to different M2M devices located within the same broadcast service area, thereby instructing specific M2M devices to either transmit or prohibiting transmission. As a prerequisite applicable for both scenarios, it is assumed that all M2M devices located within a broadcasting service area have been assigned a unique identifier, such that each of these M2M devices can be uniquely identified by the network. Such an identifier may e.g. be a Mobile Subscriber Integrated Services Digital Network Number (MSISDN).

Starting with the first scenario, described with reference to FIG. 1, a M2M device located in a first broadcast service area 100a and having data to transmit transmits a request for transmitting data via a unicast bearer, i.e. a channel capable of transmitting data via unicast, to a network node 130, capable of handling such requests, as indicated in a first step 1:1. From hereinafter such a network node will be referred to as a M2M platform, i.e. an arrangement forming part of the described communication network which is configured to, to at least limited extent, control functionality of the mentioned M2M devices which relates to data transmission over the network, but any type of functional node which is capable of initiating broadcasted instructions towards a limited, addressed group of M2M devices can be referred to. In response to such a request, the M2M platform 130 makes network specific interrogations from any suitable functionality provided from, or providing access to the network system, here represented by a network management function 140, to determine any type of present and upcoming transmission conditions, based at least partly on the network load experienced and/or estimated for the network. Here any type of conventional network management function which is capable of providing present and estimated network information indicative of the network load can be used, and, thus, details on how to obtain such information, as well as details of the specific content are out of the scope of this disclosure. Such an interrogation is indicated in FIG. 1 with a step 1:2, and a response thereto, where information on the network load is provided back to the M2M platform 130, is indicated in a subsequent step 1:3. Based on the acquired network load information, possibly in combination with further information which may be considered relevant for deciding on any upcoming transmission in the network, the M2M platform 130 makes a decision on the transmission request, as indicated with step 1:4. The result from the decision is then addressed to all M2M devices of the first broadcast service area 100a in, what here can be referred to as a first message, sent via one or more network nodes capable of distributing broadcasted transmission, represented by a provisioning node, capable of managing broadcasting and unicasting in steps 1:5 and 1:6, respectively. Here such network nodes are represented by an Ericsson Multicast Broadcast Manager (EMBM) 120, and a Broadcast Multicast Service Center (BM-SC) 110, respectively in steps 1:5 and 1:6, respectively, but any type of broadcasting enabled infrastructure may be applicable for accomplishing this task. Although not explicitly indicated in any of FIG. 1 or 2, it is to be understood that the BM-SC is broadcasting via any type of conventional wireless access nodes, capable of applying MBMS or eMBMS.

The instructions are broadcasted to the first broadcast service area 100a in a first message, as indicated in a step 1:7, thereby allowing all M2M devices located within the first broadcast service area 100a to receive a response to the request, which is similar to all M2M devices of the first broadcast service area 100a. More specifically the intention with this first message is to inform all M2M devices in the first broadcast service area 100a whether or not it is allowed to transmit any collected data over unicast. Default in this situation is to transmit instructions to all the M2M devices of the first broadcast service area instructing the addressed M2M devices to defer any transmission from this broadcast service area until any instructions to the contrary are received. By all M2M devices, we here refer to all M2M devices located within the broadcast service which are configured to transmit collected data via unicast, and thus which need to receive the mentioned instructions accordingly.

In FIG. 1 it is assumed that the first message, broadcasted in step 1:7, indicates to the M2M devices of the first broadcast service area 100a to defer any unicast transmission of data from the first broadcast service area 100a, and thus, all M2M devices located in the first broadcast service area 100a and capable of receiving broadcasted information from the network will from thereafter not start any unicast transmission until allowed to do so from the network, in any subsequent message. In the case of any ongoing transmission, such transmission is, according to one embodiment, allowed to be executed, but no new transmission is allowed. Alternatively, ongoing transmission is stopped upon receiving the first message until allowed to continue according to a subsequent message. In the present example new instructions are provided to the M2M devices of the first broadcast service area 100a in subsequent steps 1:8-1:10, which may occur at any time instance subsequent to the transmission of the instructions from the M2M platform in step 1:5.

Here it is assumed that a decision when to allow unicast transmission from the first broadcast service area 100a, i.e. how long to defer transmission from this service area, is taken at step 1:4, which is executed prior to transmission of the first message in step 1:5. In the second broadcasted message, sent in steps 1:8-1:10, all M2M devices of the first broadcast service area 100a are instructed to transmit data to the network via unicast. However, although decision 1:4 is executed before step 1:5 and step 1:8 is executed a certain time interval after initiation of step 1:5 in FIG. 1, it is to be understood that, alternatively, step 1:4 may be divided into a plurality of steps, where a first step 1:4a triggers transmission of a first set of instructions in step 1:5, assuring that no unicast transmission will be sent from the first broadcast service area 100a, while a second step 1:4b, which is initiated after the first step 1:4a, triggers transmission of a second set of instructions, executed in step 1:8.

In a subsequent step 1:11, which may follow reception of step 1:10, with or without a time delay, all according to the instructions and/or the M2M device configuration, collected data is transmitted from one or more M2M devices located within the first broadcast service area 100a, including at least the M2M device which initially sent the request in step 1:1. It is to be understood, that, depending on configuration, one or more M2M devices may be arranged such that they collect data from other M2M devices and distribute such collected data to the M2M platform 130. Smart metering devices may e.g. be arranged such that they collect utility readings e.g. from apartments on a regular bases, after which the collected data is aggregated and sent to the M2M platform.

Steps 1:12-1:18 of FIG. 1 illustrate how a process corresponding to the one described above is repeated when a subsequent request for transmitting data via unicast is received by the M2M platform 140 from a M2M device located in the second broadcast service area 100b after M2M devices of the first broadcast service area 100a have been allowed to transmit in step 1:10. The M2M devices of the second service area 100b will remain in a state prohibited from transmitting via unicast until the process is continued, starting with a message comprising instructions to start transmitting via unicast, corresponding to steps 1:8-1:11, as described above.

By executing the method as described above only M2M devices located within one broadcast service area will be allowed to transmit data via a unicast bearer at a time. When to transmit data is determined by the network, here the M2M platform, based, at least partly on determined and/or predicted network load.

The former embodiment is suitable when relatively limited amounts of data are transmitted, or only one or a few M2M devices are responsible for transmitting data from a certain broadcast service area and, thus, no scheduling of the transmitting is required. However, as an alternative to allow transmittal of data to a complete broadcast service area, a scheduling process may be applied, in case further control of the unicast data transmissions from a broadcast service area is required.

In FIG. 2 such a process starts similar to the preceding scenario where initially a first step 2:1 is initiated by a M2M device of a first broadcast service area 100a, resulting in the M2M device interrogating the network for at least network load prediction in step 2:2 and finally initiation of broadcasting of instructions, instructing the addressed M2M devices to defer transmission in step 2:7. However, compared to the first scenario, the message broadcasted in step 2:7 also comprises instructions for all the M2M devices of the addressed broadcast service area, in this case broadcast service area 100a, to provide what can be referred to as M2M individual data, which may alternatively be referred to as M2M specific data, or individual context data, i.e. data comprising information on a specific, identifiable M2M device, typically referring to its functionality or upcoming activities, in contrast to the collected data which typically does not depend on the functionality of the M2M device, to the M2M platform via unicast. Such M2M specific data, can comprise e.g. the status of a M2M device, i.e. whether the M2M device is operating correctly or not, and may be indicated e.g. as OK or not OK by setting a flag of the M2M specific data accordingly. Such data may alternatively, or in addition, include information on the amount of collected data that a respective M2M device has to send via unicast, in order to give the M2M platform an indication of the amount of collected data that can be expected to be sent from the respective broadcast service area in case a request is allowed. In addition, or as an alternative, other data which may be useful when determining when scheduling data transmission from the broadcast service area may be requested.

In FIG. 2 transmission of M2M specific data from the broadcast service area is indicated with one single step 2:8, i.e. this activity can be achieved by one or some M2M devices being configured to collect data from other addressed M2M devices and provide the collected data to the M2M platform 130 in one single message. Alternatively, each M2M device located within the addressed broadcast service area which is configured to transmit data may transmit its own unicast message comprising the requested M2M device specific data. Once the requested data, or what can be considered as enough of expected individual data, in case responses are missing from one or more M2M devices, e.g. due to malfunctioning, has been received at the M2M platform, a decision is executed based at least partly on the retrieved M2M specific data, as indicated in step 2:9. This decision is targeted to individual M2M devices, i.e. different M2M devices can receive different, M2M unique instructions, each of which again may be identified via a respective device's MSISDN, or any other unique identity.

In case status information is requested from the M2M devices and at least a response from one M2M device indicates some malfunction, e.g. a status indication which is set to "NOT OK", this may trigger the M2M platform to request, further M2M specific data, in an attempt to identify the reason for the malfunction. Such a request may be sent specifically to the M2M device in question, but this time via a unicast bearer instead of via a broadcast bearer, wherein also the further M2M specific data is sent to the M2M platform via unicast. The M2M platform may, after processing of the further M2M specific data, determine that a software update need to be sent to a malfunctioning M2M device, or it can trigger an alarm to instruct maintenance personal to repair or replace the faulty M2M device.

As indicated by step 2:10 and 2:11, the decision taken in step 2:9 is followed by the M2M platform 130 requesting the network management function 140 to validate the decision. It is to be understood that steps 2:9-2:11 may be executed in a different order, such that e.g. the network management function 140 is interrogated before any decision is taken, rather than requesting validation of a decision already taken, or the described procedure may be executed such that the M2M platform 130 and the network management function 140 are deriving a decision by interacting in a plurality of sub-decisions, before any start instructions are settled. Once a decision on how to allow unicast transmission from the first service area 100a has been determined, instructions instructing the M2M devices of the first service area 100a to start unicast transmission are sent in step 2:12 and 2:13, and such instructions are broadcasted in step 2:14. These individualized instructions may for, each addressed M2M device, comprise e.g. the respective M2M device identity, a time stamp and a queue number dedicated for each M2M device, which are generated by the M2M platform upon taking the decision.

Once the M2M devices of the first service area 100a have received the start instructions, in the first message, each addressed M2M device of the first broadcast service area will be able to identify its individualized instruction to be able to interpret its given queue number and use its allocated time stamp as an indicator of when in time to start unicast transmission, here indicated with the three different steps 2:15a, 2:15b and 2:15c originating from three different M2M devices. Based on the respective queue number and time stamp, the unicast transmissions will be spread over time and thus will avoid unwanted data bursts to occur over the unicast channel.

Figure 3:
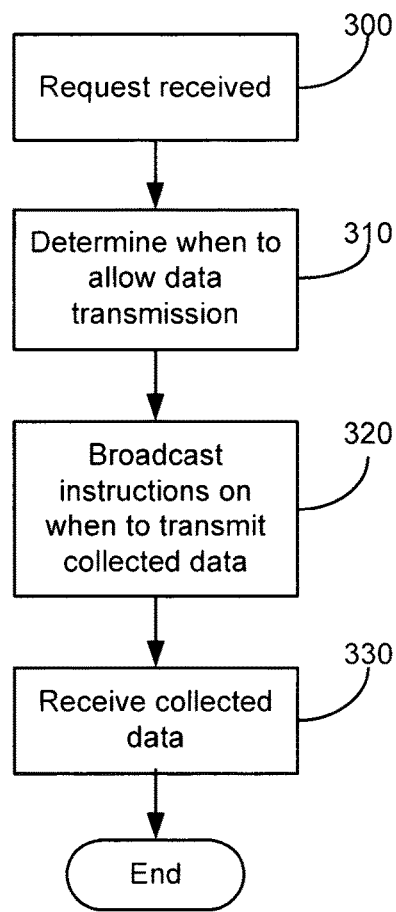
FIG. 3 is a flow chart illustrating a method executable in a network node for managing unicast transmission according to a first embodiment.

A method according to any of the embodiments described above when executed in a network node, in the given examples constituting or forming part of a M2M platform, will now be described in further detail with reference to the flow chart of FIG. 3.

In a first step 300 a request is received by the network node from one M2M device. In response to such a request the network node considers the present and/or predicted network load and determines, based in such findings, when to allow data transmission, as indicated in step 310. Instructions on when to allow transmission of collected data via unicast are distributed to the M2M devices located within the broadcast service area wherein the requesting M2M devices are located, as indicated in step 320.

After transmission has been allowed by the network node, it can receive collected data transmitted from one or more M2M devices via conventional receiving means, capable of receiving collected data via a unicast bearer, as indicated with a final step 330, which then can be processed (not shown) in any conventional manner.

Figure 4:
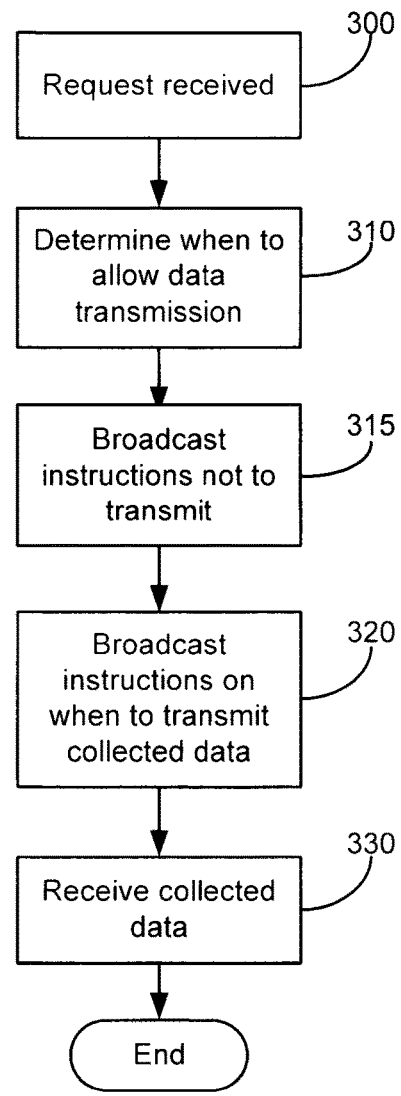
FIG. 4 is a flow chart illustrating a method executable in a network node for managing unicast transmission according to a second embodiment.

More specifically, instructions to start transmitting collected data are typically preceded by broadcasting instructions to defer transmission from the respective broadcast service area, including stopping ongoing or any further transmission, as indicated with step 315 of FIG. 4, which shows an extended method compared to FIG. 4. Alternatively, step 315 may be arranged such that an instruction to defer transmission is broadcasted to all broadcast service areas of the network.

As already mentioned above, it is to be understood that step 310 may be executed in a different order, i.e. after step 315, or in a plurality of steps, executed in different order in relation to step 315.

Figures 5, 6:
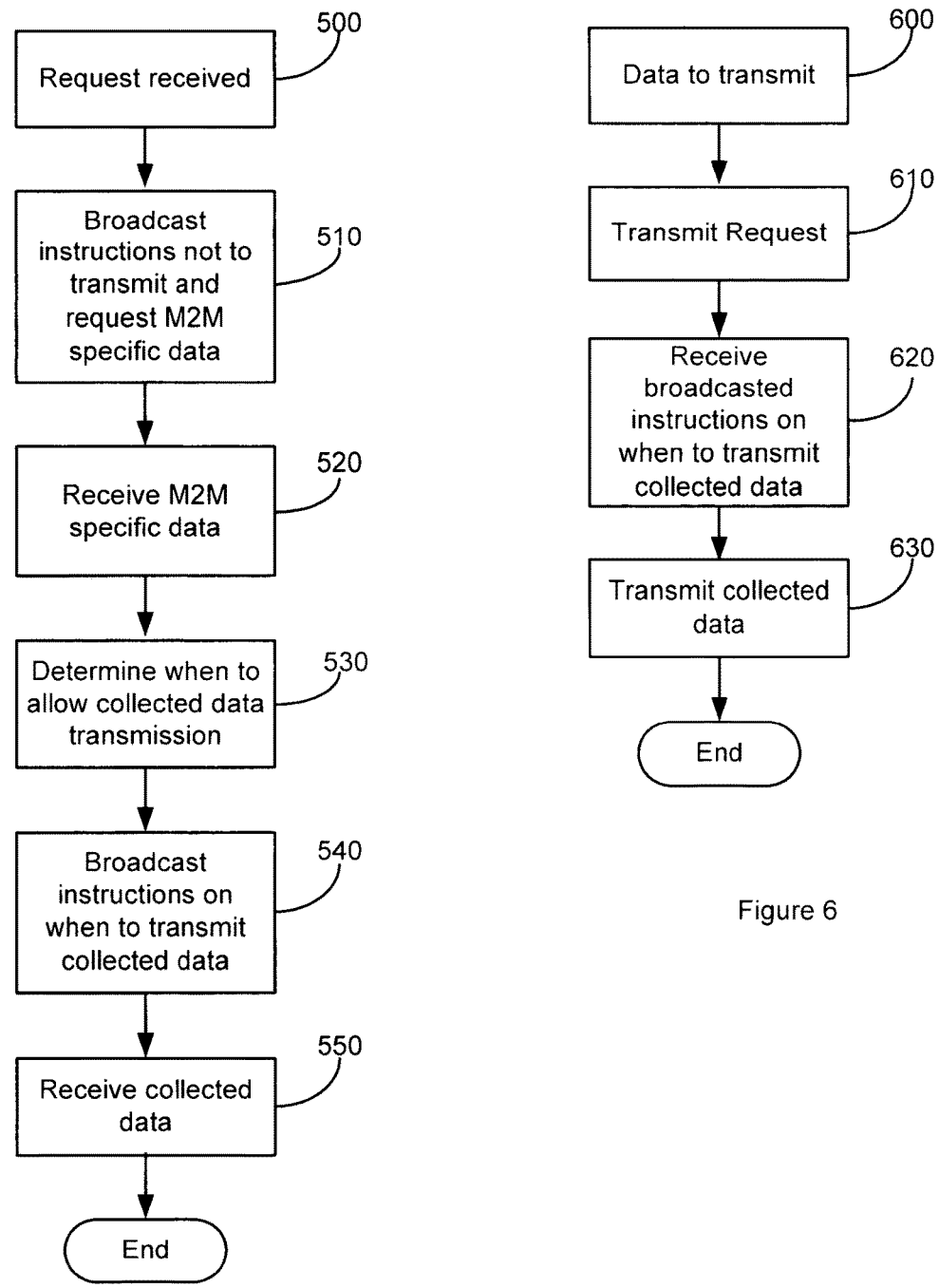
FIG. 5 is a flow chart illustrating a method executable in a network node for managing unicast transmission according to a third embodiment.
FIG. 6 is a flow chart illustrating a method executable in a M2M device for initiating and executing unicast transmission according to a first embodiment.

A method according to a second embodiment, which corresponds to the scenario as described with reference to FIG. 2 above, will now be described with reference to FIG. 5. The initial step 500 corresponds to step 300 of FIGS. 3 and 4, while in a subsequent step 510 individual data is requested from addressed M2M devices, together with the broadcasted instructions to defer transmission. In a next step 520 the requested M2M individual data is received by the network node and, based on the retrieved M2M individual data and available information on the network load, the network node determines when, and under what conditions, unicast transmission of collected data is to be allowed in another step 530. Based on the determination, further instructions are broadcasted to the broadcast service area, as indicated in step 540, and, based on the instructions and the behavior of the M2M devices, the network node then receives collected data, as indicated in step 550.

A method executed in a M2M device when performing the process as described in FIG. 1 will now be described in further detail with reference to FIG. 6. In a first step 600, a trigger to transmit data via unicast is triggered at the M2M device, which initiates a transmission of a request to transmit to a network node, as indicated in a following step 610. Such a trigger is typically initiated at regular time intervals. It is to be understood that data is collected and stored according to any known procedure, and, thus, this process will not be discussed in any further detail in this document. In a next step 620, the M2M device receives broadcasted instructions on when to transmit collected data, and in a subsequent step 630, the M2M device transmits the collected data, according to the broadcasted instructions.

Figure 7:
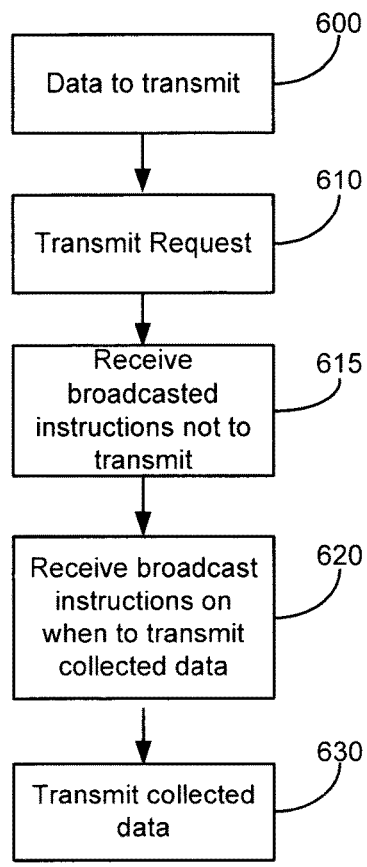
FIG. 7 is a flow chart illustrating a method executable in a M2M device for initiating and executing unicast transmission according to a second embodiment.

According to another embodiment which will now be described with reference to FIG. 7, which, as compared to FIG. 6 also comprises an additional step of receiving instructions not to transmit any collected data, indicated in a step 615, which is preceding step 620. The collected data is then transmitted in subsequent step 630.

Figure 8:
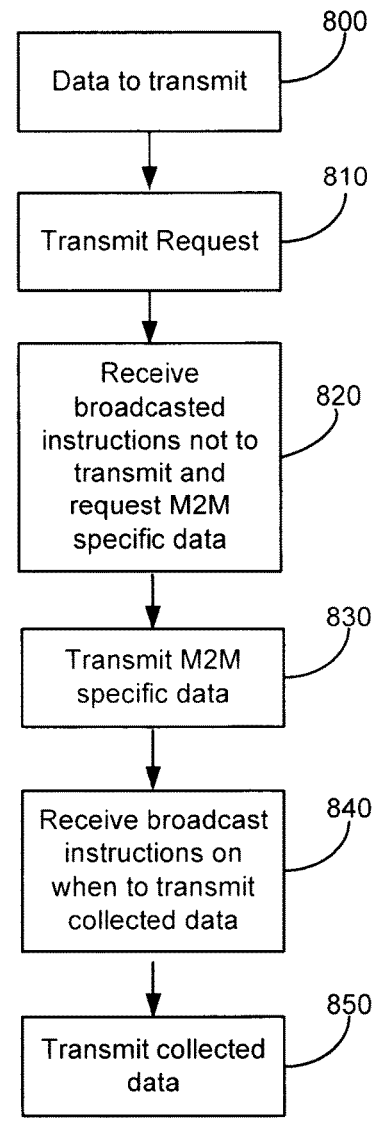
FIG. 8 is a flow chart illustrating a method executable in a M2M device for initiating and executing unicast transmission according to a third embodiment.

According to another embodiment, described with reference to FIG. 8 where initial steps 800 and 810 corresponds to step 600 and 610 respectively of FIGS. 6 and 7, the M2M device receives broadcasted instructions not to transmit collected data, together with instructions to transmit certain M2M specific data to the network node, as indicated with step 820. In a next step 830, M2M specific data is transmitted to the network node. In a next step 840, the M2M device received new instructions, instructing the M2M device to start transmitting collected data, and in a final step 850, the M2M starts transmitting collected data according to the received instructions.

It is to be understood that typically any of the methods as described above may be executed in parallel on different M2M devices.

Figure 9A:
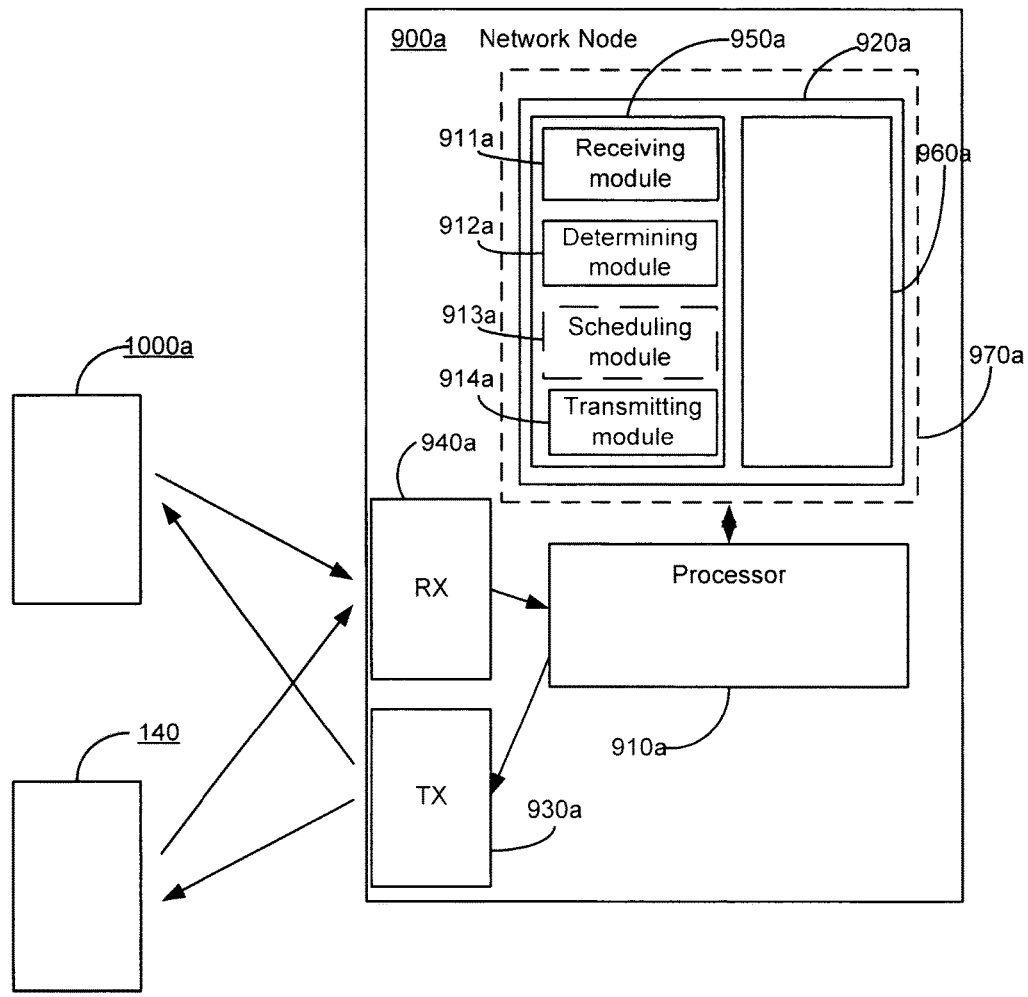
FIG. 9a is a block scheme of a network node capable of executing a method according to any of the methods as described with reference to any of FIG. 3-5.

A network node, here constituting or forming part of a M2M platform, which is capable of executing the method according to any of the embodiments described above have to be configured accordingly. Such a network node 900a will now be described in further detail with reference to FIG. 9a. It is to be understood that the network node 900a of FIG. 9a is a simplified illustration, where functional entities, such as e.g. interfaces enabling interaction with other entities or nodes, which are of no relevance for the understanding of the functionality described herein have been omitted for simplicity reasons. In FIG. 9a the network node 900a is provided with communication means for communicating with M2M devices, here represented by M2M device 1000a and a network management function 140. The same applies for network node 900b in FIG. 9b.

The network node 900a comprise one or more processors, here illustrated by processor 910a, and a memory 920a, storing instructions 950a, or program code, which when executed causes the processor 910a to execute the method steps according to any of the methods described above. The processor may be a single CPU (Central processing unit), but could alternatively comprise two or more processing units. For example, the processor 910a may include one or more general purpose microprocessors, instruction set processors and/or related chips sets and/or special purpose microprocessors, such as e.g. one or more ASICs (Application Specific Integrated Circuit), Digital Signal Processors (DSP) or forming part of a general purpose computer. The network node comprises a transmitter (TX) 930a and a receiver (RX) 940a, where the receiver 940a is capable of receiving data via a unicast channel, while the transmitter 930a is capable of transmitting instructions via broadcast, e.g. via MBMS or eMBMS enabled functionality, to M2M devices as well as requests to a network management function. The memory also comprises persistent storage 960a, which, for example, can be any single one or combination of magnetic memory, optical memory, solid state memory or even remotely mounted memory, capable e.g. of storing collected data and M2M specific data.

The instructions, or program code mentioned above may be arranged as a plurality of modules, which when interacting by execution of executable instructions allows the network node to execute any of the methods described above. Such modules may be said to comprise a plurality of computer readable or executable code units. More specifically, such an arrangement may, as indicated in FIG. 9a, comprise a receiving module 911a configured to receive a request for transmitting collected data over a unicast channel via a receiver; a determining module 912a configured to determine, on the basis of network load of the communication network provided from any type of network management function, when to allow transmission of collected data; a transmitting module 914a configured to transmit, via a transmitter, a first message, instructing M2M devices not to transmit any collected data, and a second message, instructing M2M devices when to transmit collected data. The determining module 912a is also capable of identifying each M2M device e.g. by a MSISDN provided in the request. In case the network node 900a is configured to instruct M2M devices also to provide M2M specific data to the network node 900a, the determining module 912a may be configured to request and later process also such data. The network node 900a may also comprise a scheduling module 913a configured to schedule when to allow transmission of the different M2M devices, on the basis of M2M specific data provided from the M2M devices and/or network load data provided from the network management function.

The instructions 950a are typically provided as a computer program comprising computer readable code units which may be provided as, or form part of a computer program product 970a which is accessible by the processor 910a, forming part of a computer provided at, or connected to, the network node. Such a computer program product may be arranged e.g. in the form of a non-volatile memory, such as e.g. an Electrical Erasable Programmable Read-Only Memory (EEPROM), a flash memory, a Random Access Memory (RAM) or a disc drive. In the latter case, the instructions 950a are typically arranged on a disc rather than on a memory, or on any other means capable of carrying computer readable instructions, while the processor 910a is comprised in a computer which is capable of reading the instructions on the disc or other computer readable means.

Figure 9B:
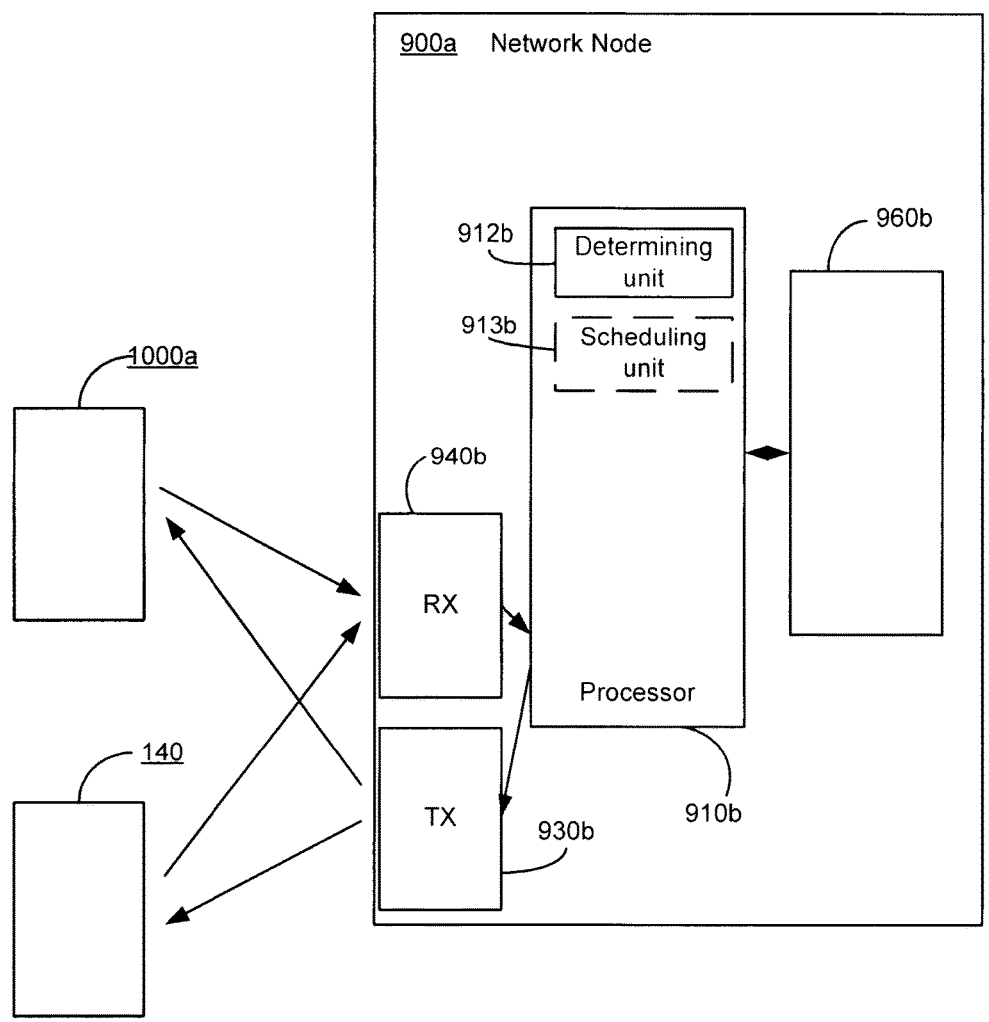

According to an alternative embodiment, which is illustrated in the simplified FIG. 9b, a processor 910b, comprising a plurality of functional units, which to at least some extent correspond to the modules described above with reference to FIG. 9a, is connected to a memory 960b, which corresponds to the memory 960a in FIG. 9a.

More specifically, the processor 910b is arranged to control a determining unit 912b, and an optional scheduling unit 913b as well as a receiver 940b, a transmitter 930b and the memory 960b in a way which corresponds to the functionality provided by the processor, memory and modules described above.

The processor 910b may e.g. be arranged as one or more microprocessors, or Programmable Logic Devices (PLDs).

Figure 10A:
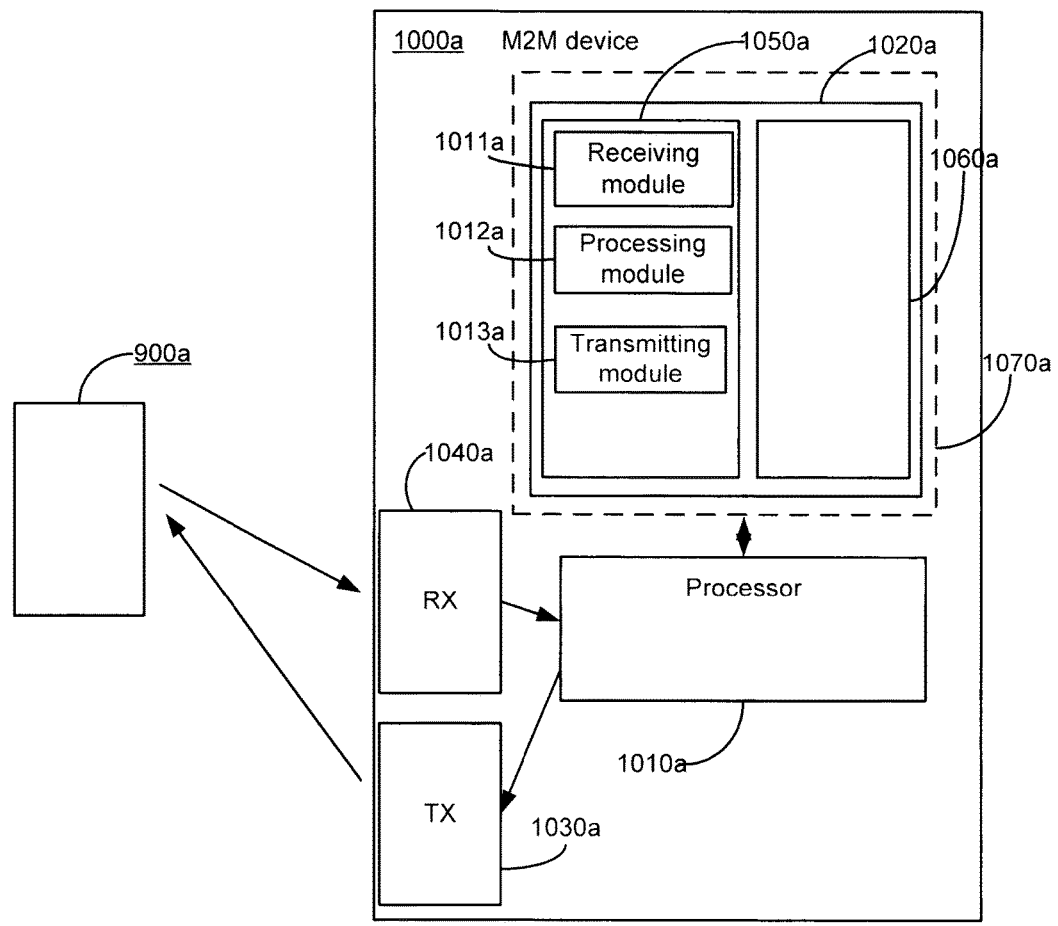
FIG. 10a is a block scheme of a M2M device capable of transmitting data under control of a network node according to any of the methods as described with reference to any of FIG. 6-8.

Accordingly, also a M2M device capable of interacting with a network unit, and possibly also with other M2M devices for which it can forward collected data to the M2M platform when executing any of the methods described above must be adapted accordingly. Such a M2M device will now be described in further detail with reference to FIG. 10a. It is to be understood that the M2M device 1000a of FIG. 10a is a simplified illustration, where functional entities, such as e.g. interfaces enabling interaction with other entities or nodes, which are of no relevance for the understanding of the functionality described herein have been omitted for simplicity reasons. In FIG. 10a, M2M device 1000a is capable of communicating to network node 900.

The M2M device 1000a of FIG. 10a, comprise one or more processors, here illustrated by processor 1010a, and a memory 1020a, storing instructions 1050a, or program code, which when executed causes the processor 1010a to execute the method steps according to any of the methods described above. The M2M device 1000a comprises a transmitter (TX) 1030a and a receiver (RX) 1040a, where the receiver 1040a is capable of receiving instructions via broadcast, e.g. via MBMS or eMBMS, while the transmitter 1030a is capable of transmitting collected data, and optionally also M2M specific data, via unicast. Although, indicated via TX 1030a, and RX 1040a, the M2M device typically also comprises separate interfaces for accessing other M2M devices, i.e. for collecting data and optionally also for accessing certain M2M specific data for further distribution to a network node for further processing. However, since this feature may be executed by applying conventional principles, and is thus out of the scope of this document, details on how to forwarding such data have been omitted. The memory also comprises persistent storage 1060a, which, for example, can be any single one or combination of magnetic memory, optical memory, solid state memory or even remotely mounted memory, capable e.g. of storing collected data and M2M specific data.

The instructions 1050a, or program code, is typically arranged as a plurality of modules, which when interacting allows the M2M device 1000a to execute any of the methods described above. Such modules may be said to comprise a plurality of computer readable code units. More specifically the suggested instructions of the M2M device 1000a may comprise a receiving module 1011a configured to receive instructions via the receiver 1040a, where the instructions are provided as messages from the M2M platform via a broadcast bearer, and optionally also data collected from other M2M devices, provided via an appropriate interface, a processing module 1012a configured to interpret and process provided instructions accordingly, and a transmitting module 1013a configured to transmit data, which may comprise collected data and optionally also M2M specific data, to the M2M platform via a unicast channel via the transmitting unit 1030a. The processing module 1012a can further be configured to identify a received message as addressed to a specific M2M device, as well as to attach an identity of a respective M2M device into any request, or message comprising M2M specific data, sent via a unicast bearer to the network.

The instructions 1050a are typically provided as a computer program comprising computer readable code units which may be provided as, or form part of a computer program product 1070a which is accessible by the processor 1010a, forming part of a computer arranged on, or connected to, the M2M device 1000a. Such a computer program product may be arranged e.g. in the form of a non-volatile memory, such as e.g. an Electrical Erasable Programmable Read-Only Memory (EEPROM) a flash memory, a Random Access Memory (RAM), or a disc drive. In the latter case, the instructions 1050a are typically arranged on a disc rather than on a memory, or on any other means capable of carrying computer readable instructions.

Figure 10B:
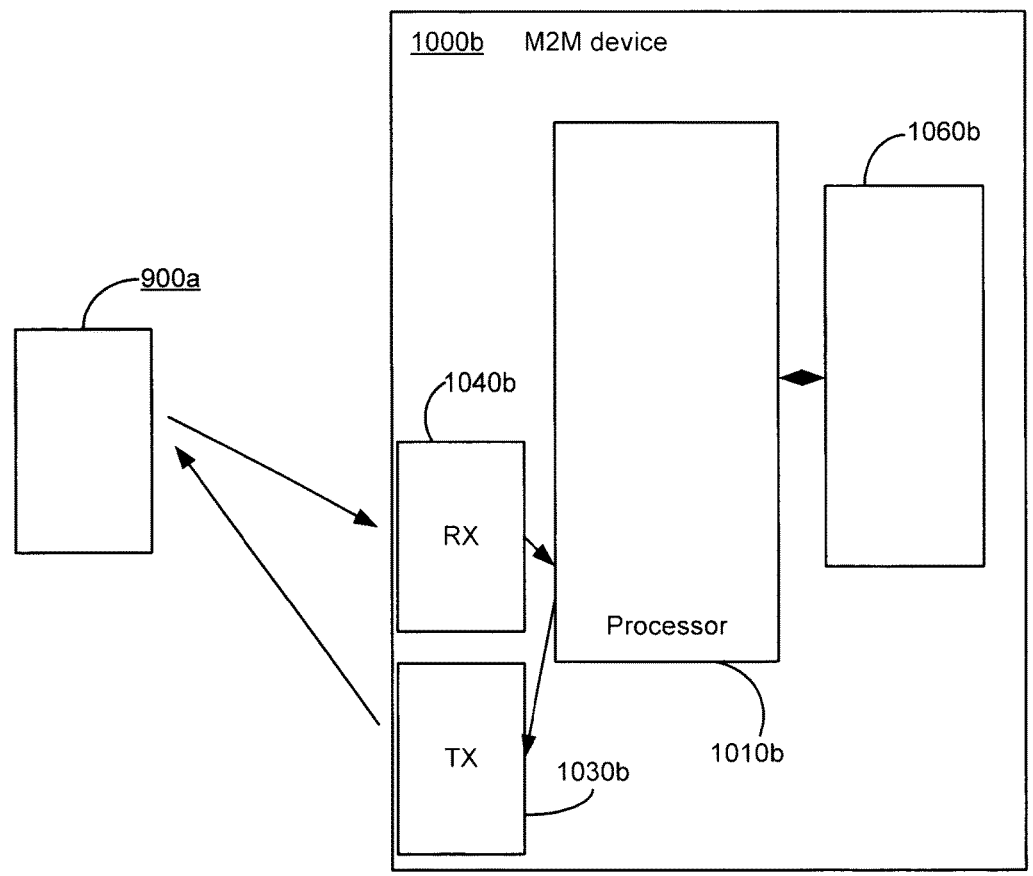

According to an alternative embodiment, which is illustrated in the simplified FIG. 10b, a processor 1010b, is connected to a memory 1060b, which corresponds to the memory 1060a in FIG. 10a.

More specifically, the processor 1010b is arranged to operate as a controlling unit, capable of interpreting and processing instructions received from a network node 900a, 900b, and of controlling the receiver 1040b, transmitter 1030b and the memory 1060b in a way which corresponds to the functionality provided by the modules described above.

The processor 1010b, may e.g. be arranged as one or more microprocessors or Programmable Logic Devices (PLDs).

It is to be understood that the examples and embodiments as explained above are merely illustrative and susceptible to various modifications. For example, the concepts could be used in various types of mobile network, which are capable of providing broadcasting features as well as unicast transmissions. Further, it is to be understood that the above concepts may be implemented by using correspondingly designed software in existing network devices, or by using dedicated network device hardware. Also, it is to be understood that each of the illustrated nodes may be implemented as single device or by multiple interacting devices.

The invention claimed is:

1. A method executed in a network node capable of managing transmission of data transmitted over a unicast channel in a communication network from a plurality of M2M devices located in a first broadcast service area, the method comprising:
receiving, from a first of said plurality of M2M devices located in the first broadcast service area and having collected data to transmit, a request to transmit the collected data over the communication network via a unicast channel;
as a result of receiving the request to transmit the collected data, obtaining network load information indicating a network load of the communication network and determining, on the basis of the indicated network load of the communication network, when to allow transmission of collected data for M2M devices located in the first broadcast service area, wherein determining when to allow transmission of collected data comprises determining, based on the network load of the communication network, that transmission of collected data should be deferred to a later point in time;
as a result of determining that transmission of collected data should be deferred to a later point in time, transmitting, via a broadcast transmission, a first message addressed to said plurality of M2M devices located in the first broadcast service area, wherein the first message comprises information instructing each of said plurality of M2M devices to defer a transmission of collected data within the first broadcast service area at least until the M2M device receives a further instruction indicating that a transmission of collected data is permissible within the first broadcast service area;
after transmitting the first message, transmitting, via broadcast transmission, a second message in the first broadcast service area comprising further instructions for at least one of said M2M devices to transmit collected data over the unicast channel; and
receiving collected data transmitted over the unicast channel.

2. The method of claim 1, wherein
the first message comprises information instructing the plurality of M2M devices located in the first broadcast service area to provide, to the network node, M2M device specific data, and
the method further comprises:
receiving, in response to the first message, a response message comprising the requested M2M specific data;
scheduling at least one of the M2M devices for which the requested information has been provided;
providing, in the second message, a time stamp and a queue number for each of said scheduled M2M devices; and
receiving, collected data from the scheduled M2M devices according to the time stamps and queue numbers.

3. The method of claim 2, wherein the M2M device specific data comprises information on amount of data requested to be sent via the unicast channel.

4. The method of claim 2, wherein the M2M device specific data comprises an indication of the present status of at least one M2M device.

5. The method of claim 1, wherein each M2M device is identified by the network node by a unique identifier.

6. The method of claim 1, wherein the second message is address to the plurality of M2M devices located in the first broadcast service area.

7. The method of claim 6, wherein
transmitting the second message addressed to the plurality of M2M devices via a broadcast transmission comprises the network node transmitting the second message such that the second message is received by a second node, and
the second node transmits the second message via the broadcast transmission.

8. The method of claim 7, wherein the second node comprises a Broadcast Multicast Service Center (BM-SC).

9. The method of claim 1, wherein
the first message includes an instruction for causing one or more M2M devices to transmit a status message, and
the method further comprises, after transmitting the first message and prior to transmitting the second message, receiving a status message transmitted by one of the plurality of M2M devices in response to the first message, the status message comprising status information indicating a status of the M2M device that transmitted the status message.

10. The method of claim 9, wherein the status information indicating the status of the M2M device indicates an amount of data collected by the M2M device.

11. The method of claim 10, wherein the second message comprises information indicating a time at which the M2M device is allowed to transmit collected data.

12. A method executed in a M2M device located in a broadcast service area and capable of transmitting data over a unicast channel to a network node of a communication network, the method comprising:
storing collected data;
transmitting, to the network node, a request to transmit the collected data over the communication network via a unicast channel;
receiving, via broadcast transmission, a response to said request, said response instructing said M2M device to defer a transmission of collected data within the broadcast service area at least until the M2M device receives a further instruction indicating that a transmission of collected data is permissible within the broadcast service area;
after receiving the response, receiving, via broadcast transmission, a first message indicating a time at which the M2M device should transmit said collected data over the unicast channel, and
transmitting said collected data over the unicast channel.

13. The method of claim 12, wherein
the response further comprises information instructing the M2M device to provide to the network node M2M device specific data,
the method further comprises transmitting, in response to the response, a message comprising the requested M2M specific data,
the first message comprises a time stamp indicating said time at which the M2M device should transmit said collected data, and
the step of transmitting said collected data over the unicast channel comprises transmitting said collected data to the network node based at least on the time stamp.

14. The method of claim 13, wherein the M2M device specific data comprises information on amount of data needed to be sent from the M2M device via the unicast channel.

15. The method of claim 13, wherein the M2M device specific data comprises an indication of the present status of at least said M2M device.

16. The method of claim 12, wherein each transmission to the network node comprises identifying the respective M2M device from which data is provided by a unique identifier.

17. A network node capable of managing transmission of data transmitted over a unicast channel in a communication network by a plurality of M2M devices located in at least one broadcast service area, said plurality of M2M devices comprising a first M2M device having collected data to transmit, the network node comprising:
at least one processor; and
a memory storing instructions which, when executed by the at least one processor causes the network node to:
as a result of receiving from said first M2M device a request to send the collected data, obtain network load information indicating a network load of the communication network and determine, on the basis of the indicated network load of the communication network, whether to allow, at the present time, the first M2M device to transmit the collected data, wherein determining whether to allow the first M2M device to transmit the collected data by performing a process comprising determining, based on the network load of the communication network, that transmission of collected data should be deferred to a later point in time;
as a result of determining that transmission of collected data should be deferred to a later point in time, transmit, via a broadcast transmission, a first message, wherein the first message comprises information instructing each of said plurality of M2M devices to defer a transmission of collected data within the first broadcast service area at least until the M2M device receives a further instruction indicating that a transmission of collected data is permissible within the first broadcast service area
after transmitting the first message, transmit, via broadcast transmission, a second message, addressed to M2M devices located in the first broadcast service area, comprising further instructions for at least one of said M2M devices when to transmit data over a unicast channel, and
receive data transmitted over the unicast channel.

18. The network node of claim 17, wherein
the first message comprises information instructing the plurality of M2M devices located in the first broadcast service area to provide, to the network node, M2M device specific data,
the network node is adapted to receive a response message comprising the requested M2M specific data,
the network node is configured to schedule at least one of the M2M devices for which the requested information has been provided, and
the network node is configured to provide, in the second message, a time stamp and a queue number for each of said scheduled M2M devices.

19. The network node of claim 18, wherein the M2M device specific data comprises information on amount of data needed to be sent by said M2M device via the unicast channel.

20. The network node of claim 18, wherein the M2M device specific data comprises an indication of the present status of at least said M2M device.

21. The network node of claim 17, wherein each M2M device is identifiable by the network node by a unique identifier.

22. A computer program product comprising a non-transitory computer readable medium storing a computer program for managing transmission of data transmitted over a unicast channel in a communication network by a plurality of M2M devices located in at least one broadcast service area, the computer program comprising computer readable code units which, when run on a computer causes the computer to:
as a result of the computer receiving, from a first of said plurality of M2M devices located in a first broadcast service area and having collected data to transmit, a request to send the collected data over the communication network via a unicast channel obtain network load information indicating a network load of the communication network and determine, on the basis of the indicated network load of the communication network, when to allow transmission of the collected data for M2M devices located in the first broadcast service area, wherein determining when to allow transmission of collected data comprises determining, based on the network load of the communication network, that transmission of collected data should be deferred to a later point in time;
as a result of determining that transmission of collected data should be deferred to a later point in time, transmit, via a broadcast transmission, a first message addressed to said plurality of M2M devices located in the first broadcast service area, wherein the first message comprises information instructing each of said plurality of M2M devices to defer a transmission of collected data within the first broadcast service area at least until the M2M device receives a further instruction indicating that a transmission of collected data is permissible within the first broadcast service area;
after transmitting the first message, transmit, via broadcast transmission, at least a second message, addressed to M2M devices located in the first broadcast service area, comprising further instructions for at least one of said M2M devices when to transmit data over the unicast channel, and
receive data transmitted over the unicast channel.

23. A M2M device capable of transmitting data over a unicast channel to a network node of a communication network when located in a broadcast service area, the M2M device comprising at least one processor, and a memory storing instructions which, when executed by the at least one processor causes the M2M device to:
store collected data;
transmit, to the network node, a request to transmit the collected data over the communication network via a unicast channel;
receive, via broadcast transmission, a response to said request, said response instructing said M2M device to defer a transmission of collected data within the broadcast service area at least until the M2M device receives a further instruction indicating that a transmission of collected data is permissible within the broadcast service area;
process a first message received via broadcast transmission after receiving the response, the first message comprising information indicating a time at which the M2M device may transmit the collected data over the unicast channel; and wait until the indicated time to transmit the collected data over the unicast channel so that the collected data is not transmitted before the indicated time.

24. The M2M device according to claim 23, wherein the M2M device is configured to:

defer transmitting the collected data in response to receiving a second message instructing the M2M device to defer transmitting the collected data.

25. The M2M device of claim 23, wherein the M2M device is further configured to transmit M2M specific data in response to the second message, and the information indicating a time at which the M2M device may transmit the collected data comprises one or more of: a timestamp and a queue number.

26. The M2M device of claim 25, wherein the M2M specific data comprises information indicating an amount of collected data needed to be sent via the unicast channel.

27. The M2M device of claim 25, wherein the M2M specific data comprises information indicating a status of the M2M device.

28. The M2M device of claim 27, wherein the M2M specific data further comprises a unique identifier identifying the M2M device.

29. A computer program product comprising a non-transitory computer readable medium storing computer program for transmitting data over a unicast channel to a network node of a communication network, the computer program comprising computer readable code units which, when run on a computer causes the computer to:

store collected data;

transmit, to the network node, a request to transmit the collected data over the communication network via a unicast channel;

receive, via broadcast transmission, a response to said request, said response instructing said M2M device to defer a transmission of collected data within the broadcast service area at least until the M2M device receives a further instruction indicating that a transmission of collected data is permissible within the broadcast service area;

process a first message received via broadcast transmission after receiving the response, the first message comprising information indicating a time at which the M2M device may transmit the collected data over the unicast channel; and wait until the indicated time to transmit the collected data over the unicast channel so that the collected data is not transmitted before the indicated time.

30. A method executed in a network node capable of managing transmission of data transmitted over a unicast channel in a communication network from a plurality of M2M devices located in a first broadcast service area, the method comprising:

receiving, from a first of said plurality of M2M devices located in the first broadcast service area and having collected data to transmit, a request to transmit the collected data over the communication network via a unicast channel;

as a result of receiving the request to transmit the collected data, obtaining network load information indicating a network load of the communication network and using the obtained network load information to determine whether to transmit a particular message in response to the request to transmit the collected data;

transmitting, via broadcast transmission, the particular message; and receiving collected data transmitted over the unicast channel, wherein the particular message is addressed to each of the plurality of M2M devices and comprises information instructing each of said plurality of M2M devices to defer a transmission of collected data within the first broadcast service area at least until the M2M device receives a further instruction indicating that a transmission of collected data is permissible within the first broadcast service area.

* * * * *